United States Patent [19]

Woo

[11] Patent Number: 6,091,816

[45] Date of Patent: *Jul. 18, 2000

[54] INTEGRATED AUDIO RECORDING AND GPS SYSTEM

[75] Inventor: Arthur N. Woo, Cupertino, Calif.

[73] Assignee: Trimble Navigation Limited, Sunnyvale, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/872,083

[22] Filed: Jun. 10, 1997

Related U.S. Application Data

[63] Continuation of application No. 08/554,818, Nov. 7, 1995, abandoned.

[51] Int. Cl.⁷ .............................. H04L 9/00; H04K 1/00; G01S 5/02
[52] U.S. Cl. .................... 380/4; 380/23; 380/25; 342/357.13
[58] Field of Search .............................. 342/357, 357.13, 342/357.007; 380/4, 23, 25

[56] References Cited

U.S. PATENT DOCUMENTS

| | | | |
|---|---|---|---|
| 4,004,089 | 1/1977 | Richard et al. | 178/22 |
| 4,477,848 | 10/1984 | McWhirter et al. | 360/60 |
| 4,589,100 | 5/1986 | Savit | 342/357 |
| 4,717,973 | 1/1988 | McWhirter | 360/31 |
| 4,860,352 | 8/1989 | Laurance et al. | 380/23 |
| 5,142,564 | 8/1992 | Chu | 379/67 |
| 5,170,164 | 12/1992 | Lewis | 340/988 |
| 5,185,610 | 2/1993 | Ward et al. | 342/357 |
| 5,202,694 | 4/1993 | Farmer et al. | 342/357 |
| 5,202,829 | 4/1993 | Geier | 364/449 |
| 5,214,757 | 5/1993 | Mauney et al. | 395/161 |
| 5,237,610 | 8/1993 | Gammie et al. | 380/10 |
| 5,270,809 | 12/1993 | Gammie et al. | 358/84 |
| 5,311,197 | 5/1994 | Sorden et al. | 342/457 |
| 5,335,072 | 8/1994 | Tanaka et al. | 348/232 |
| 5,408,444 | 4/1995 | Kita et al. | 368/47 |
| 5,422,814 | 6/1995 | Sprague et al. | 364/449 |
| 5,422,816 | 6/1995 | Sprague et al. | 364/449 |
| 5,450,344 | 9/1995 | Woo et al. | 364/449 |
| 5,479,351 | 12/1995 | Woo et al. | 364/449 |
| 5,497,419 | 3/1996 | Hill | 380/9 |
| 5,499,294 | 3/1996 | Friedman | 380/10 |
| 5,508,736 | 4/1996 | Cooper | 348/144 |
| 5,557,524 | 9/1996 | Maki | 364/424.04 |

*Primary Examiner*—Gail O. Hayes
*Assistant Examiner*—Hrayr A. Sayadian
*Attorney, Agent, or Firm*—Wagner, Murabito & Hao LLP

[57] ABSTRACT

A method and apparatus for indicating the time and location at which audio signals are received by a user-carried audio-only recording device. In one embodiment, audio signals are received at a receiver of a user-carried audio-only recording device. A position determining system generates position information indicative of the location of the portable user-carried audio-only recording device when the receiver of the portable user-carried audio-only recording device receives the audio signals. The audio signals and the position information are stored onto recording media. The present embodiment integrates the position information with the audio signals such that alteration of the position information stored on the recording media results in alteration of corresponding audio input signals stored on the recording media.

17 Claims, 4 Drawing Sheets

INTEGRATED AUDIO RECORDING AND GPS SYSTEM

This application is a Continued Prosecution of U.S. patent application entitled, "INTEGRATED AUDIO RECORDING AND GPS SYSTEM" Ser. No. 08/554,818 filed Nov. 7, 1995 now abandoned.

TECHNICAL FIELD

This invention relates to position determining systems. Specifically, the present invention relates to integrating a position determining system with an audio recording device.

BACKGROUND ART

Audio recording has evolved significantly with the advent of improved technology. Recording techniques as well as changes in recording media affect the way audio recordings are conducted. As an example, when filming a motion picture or other type of video production, video and audio have been recorded separately. The two separate recordings must be precisely synchronized to insure that the audio recording matches the video image. Synchronization of the video and audio recordings has been accomplished using a clapper slate board. The audible clap created when a technician snaps the slate board in front of the camera is used during editing to manually synchronize the audio recording with the video recording. The editor simply views the video image of the snapping clapper slate, and then manually adjusts the timing of the audio recording such that the image of the clapper snapping shut and the sound of the clapper snapping shut are synchronized. Such synchronization can now be accomplished using electronic clapper slates. Electronic clapper slates display a Society of Motion Picture and Television Engineers'(SMPTE) code, usually in large red light emitting diode numerals. The SMPTE code displayed is then used to electronically synchronize the video recording with a separate audio recording.

Changes in available recording media also significantly affect the art of audio recording. Recording media has evolved from simple reel-to-reel tapes, to cassette tapes, to advanced solid state recording media. With the introduction of solid state recording media, audio and video recordings can be made together on the same media. Additionally, solid state recording media allow for digital recording of audio alone. Digital audio recording is especially useful for editing purposes. That is, the digital information comprising the digital audio recording can be manipulated or edited using well known digital processing technology.

Conventional portable hand-held audio recording devices, commonly referred to as "Dictaphones", have also benefited from improved audio recording technologies. For example, portable hand-held audio devices are now available which allow the user to field edit audio recordings. That is, the user is able to use the same device to make and edit an audio recording. Such edit-compatible audio devices are particularly well suited for use by reporters and the like. Some portable hand-held audio recording devices even include speech recognition capabilities for converting the audio recordings into text. Thus, a user is able to edit the audio recording using familiar word processing commands and functions. A reporter can record a story while at the scene of the event, edit the story while still at the scene of the event, print, or even download and send the edited story to the reporter's office.

Although such advancements improve audio recording capabilities, shortcomings still exist. Specifically, it is often desirable to know the exact location and/or time during which a solid state audio recording was made. Although it is possible to estimate the location or time at which the recording was made, such estimates are not always correct, and are often not accurate enough to be of value. Additionally, because solid state memory is not easily physically observed, visually detecting or estimating the duration during which a tape has been recording is no longer an option. Thus, the user is left to estimate the amount of time which has elapsed during an audio recording.

Thus, a need exists for an audio recording device and method which indicates the time and the position at which an audio recording is made.

DISCLOSURE OF THE INVENTION

It is therefore an object of the present invention to provide an audio recording device and method which indicates the time and the position at which an audio recording is made. The above object has been achieved by an audio recording device which has a position determining system integral therewith.

In the present invention, a method and apparatus for indicating the time and location at which audio signals are received by an audio recording device is disclosed. Specifically, in one embodiment, audio signals are received at a receiver of an audio recording device. A position determining system generates position information indicative of the location of the portable audio recording device when the receiver of the portable audio device receives the audio signals. The audio signals and the position information are stored onto recording media.

In one embodiment, the position determining system is selected from the class of satellite-based radio navigation systems consisting of the Global Positioning System and the Global Orbiting Navigation System. In yet another embodiment, the position determining system is selected from the class of ground-based radio navigation systems consisting of (long range navigation) LORAN (short range navigation), Shoran, Decca, and (tactical air navigation) TACAN.

In another embodiment of the invention, the recording media onto which the audio signals and the position information are stored is comprised of solid state memory media.

In yet another embodiment of the invention, the digital audio signals and the position information are integrated in such a way as to prevent altering of the received position information.

Thus, the present invention provides an audio recording device and method which indicates the time and the position at which an audio recording is made.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 1:
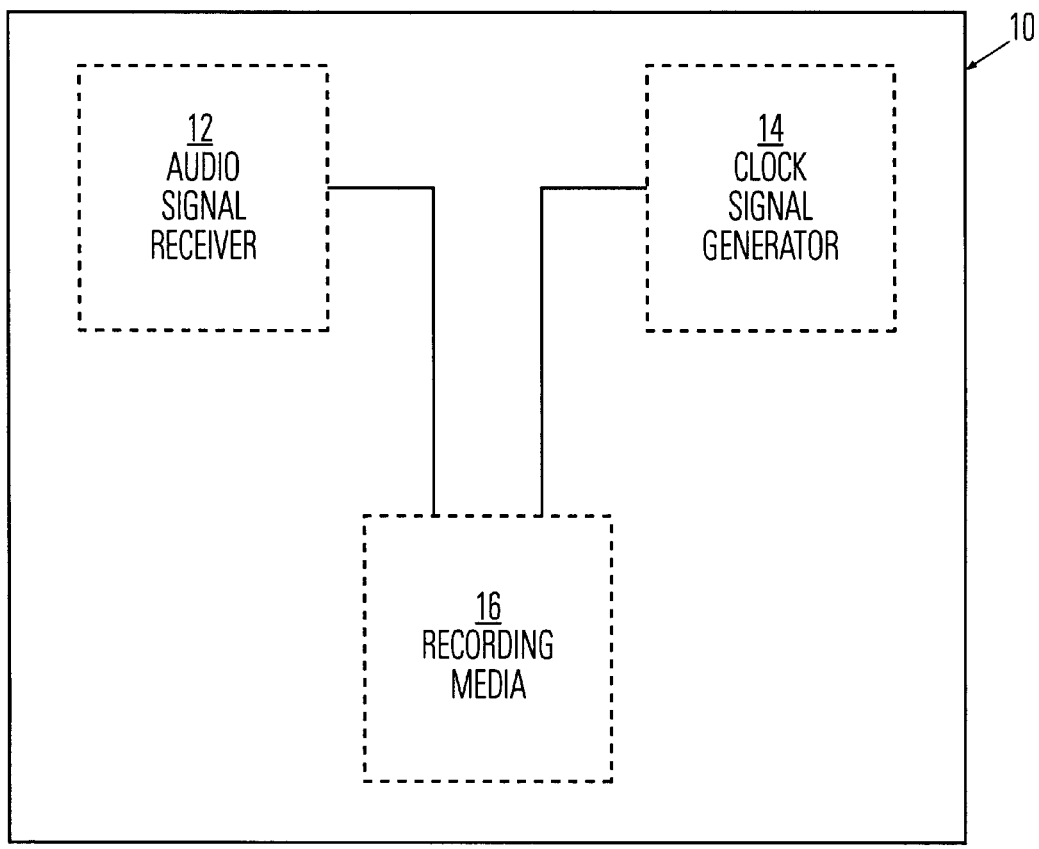
FIG. 1 is a schematic diagram of a time-stamped portable audio recording device in accordance with the present claimed invention.

With reference now to FIG. 1, a schematic diagram of one embodiment of the present invention is shown. Specifically, a portable audio recording device 10 seamlessly integrated in a common package with a clock signal generator is shown. As shown in FIG. 1, portable audio recording device 10 includes an audio signal receiver 12, a clock signal generator 14, and recording media 16. In the present embodiment, audio signal recorder further contains processing logic. It will be understood by those of ordinary skill in the art that numerous other well known features, which are not shown for purposes of clarity, will be included for operation of a portable audio recording device. Such well known features include but are not limited to, editing logic, processing logic, user controls, power circuitry, and the like.

With reference still to FIG. 1, in the present embodiment, clock signal generator 14 is, for example, a quartz clock. Although a quartz clock is used in the present embodiment, the present invention is well suited to the use of other clock signal generating methods or devices such as, for example, an SMPTE code generator, and the like. As audio signal receiver 12 receives input audio signals such as, for example, a human voice, clock signal generator 14 generates time information signals. The time information signals indicate the time at which the audio signals were received by audio signal receiver 12. The time information is stored along with the received audio signals in recording media 16. In so doing, the present invention accurately and automatically time-stamps the recorded audio signals.

In the present embodiment, clock signal generator 14 generates time information in a format which is useful to a user during playback. That is, in one embodiment, clock signal generator 14 includes voice synthesizing logic. Thus, the time information generated by clock signal generator 14 is recorded as a voice message which indicates the time at which the audio signals were received by audio signal receiver 12. In such an embodiment, playback of recorded audio signals include a voice message stating, for example, "The following recording was made at 9:16 am Sep. 24, 1965." In the present embodiment, frame level accuracy is achieved in the time-stamping of the audio recording. The present invention also allows the user to select the period or frequency at which the audio signals are time-stamped. That is, in one embodiment, clock signal generator 14 includes user-selectable time-stamp parameters. Thus, a user can select to have the audio signals automatically time-stamped, for example, only when recording initially begins, after each time the pause or stop button is used, at regular time intervals, and the like. In another embodiment, the present invention time-stamps the recorded audio signals only upon activation by the user of a time-stamp activator coupled to clock signal generator 14. In such an embodiment, when the user feels that a time-stamp is needed, the user, for example, presses a time-stamp button, and the audio signals are time-stamped. Thus, the present invention allows the user to select the frequency or period at which the audio signals are time-stamped.

With reference still to FIG. 1, in the present embodiment, recording media 16 is comprised of solid state recording media. Although solid state recording media is used in the present embodiment, the present invention is also well suited to the use of other types of recording media, including but not limited to, reel-to-reel tapes, cassette tapes, and the like.

Figure 2:
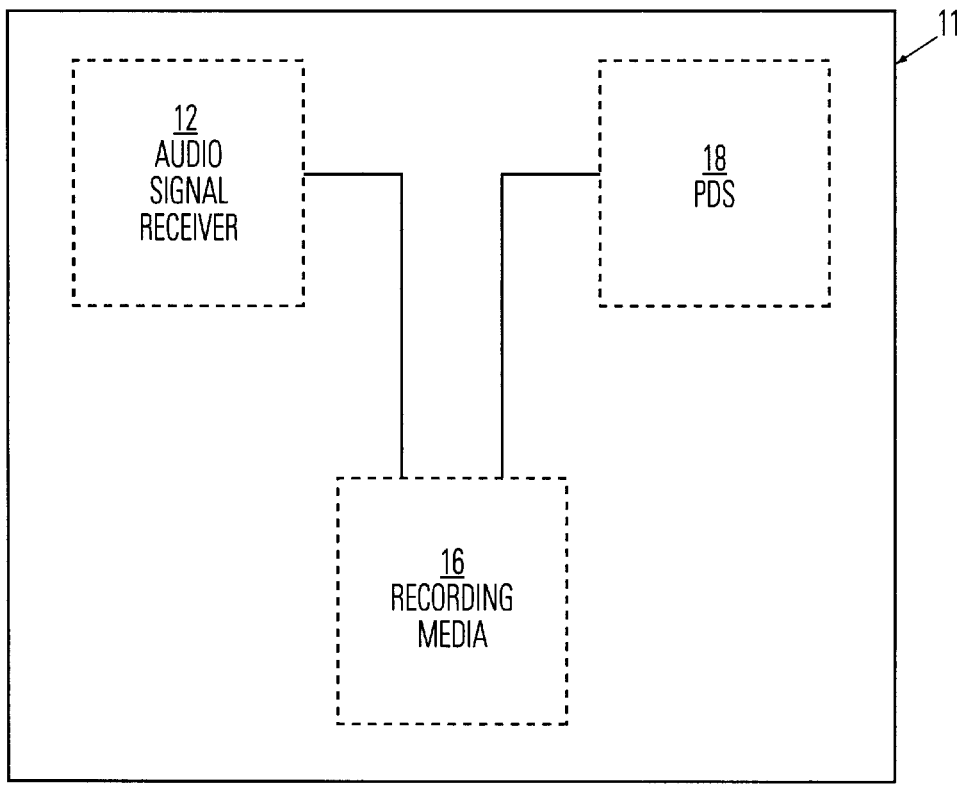
FIG. 2 is a schematic diagram of an integrated position determining system and portable audio recording device in accordance with the present claimed invention.

With reference now to FIG. 2, a schematic diagram of another embodiment of the present invention is shown. Specifically, a portable audio recording device 11 seamlessly integrated in a common package with a position determining system is shown. Specifically, portable audio recording device 11 of the present embodiment includes an audio signal receiver 12, a position determining system 18, and recording media 16. As stated above, it will be understood by those of ordinary skill in the art that numerous other well known features, which are not shown for purposes of clarity, will be included for operation of a portable audio recording device. Such well known features include but are not limited to, editing logic, processing logic, user controls, power circuitry, and the like.

With reference still to FIG. 2, position determining system 18 generates position information indicating, for example, the latitude, longitude, altitude, and velocity of portable audio recording device 11. Position determining system 18 also accurately determines the time at which portable audio recording device 11 is at a specific location. Furthermore, unlike a quartz crystal or other types of clock, the intrinsic clock of position determining system 18 need not be set or verified. As audio signal receiver 12 receives input audio signals, position determining system 18 generates position information. The position information indicates the location of portable audio recording device 11 when audio signals were received by audio signal receiver 12. The position information is stored along with the received audio signals in recording media 16. In so doing, the present invention accurately and automatically determines the location at which the audio signals were recorded.

In the present embodiment, position determining system 18 generates position information in a format which is useful to a user during playback. That is, in one embodiment, position determining system 18 includes voice synthesizing logic. Thus, the position information generated by position determining system 18 is recorded as a voice message which indicates the position of portable audio recording device 11 when the audio signals were received by audio signal receiver 12. In such an embodiment, playback of recorded audio signals include a voice message stating, for example, "The following recording was made at X latitude, Y longitude, and Z altitude." In another embodiment of the present invention a (geographic information system) GIS database is coupled to position determining system 18. In such an embodiment, playback of recorded audio signals include a voice message stating, for example, "The following recording was made on Main street between 1st and 2nd avenue, in Elm City, Calif."

The present invention also allows the user to select the period or frequency at which the audio signals are position-stamped. That is, in one embodiment, position determining system 18 includes user-selectable position-stamp parameters. Thus, a user can select to have the audio signals automatically position-stamped, for example, only when recording initially begins, after each time the pause or stop button is used, at regular time intervals, and the like. In another embodiment, the present invention position-stamps the recorded audio signals only upon activation by the user of a position-stamp activator coupled to position determining system 18. In such an embodiment, when the user feels that a position-stamp is needed, the user, for example, presses a position-stamp button, and the audio signals are position-stamped. In yet another embodiment, the present invention position-stamps the audio signals only when portable audio recording device 11 has been moved a selected distance. Thus, the present invention allows the user to select the frequency or period at which the audio signals are position-stamped.

Referring still to FIG. 2, in the present embodiment, position determining system 18 is, for example, a satellite-based radio navigation system such as the Global Positioning System (GPS), or the Global Orbiting Navigational System (GLONASS). Although such systems are specifically mentioned in the present embodiment, the present invention is also well suited to land-based radio navigation systems such as, for example, LORAN, Shoran, and Decca. Additionally, the present invention is also well suited to recording GPS ephemeris data.

With reference still to FIG. 2, in the present embodiment, recording media 16 is comprised of solid state recording media. Although solid state recording media is used in the present embodiment, the present invention is also well suited to the use of other types of recording media, including but not limited to, reel-to-reel tapes, cassette tapes, and the like.

Figure 3:
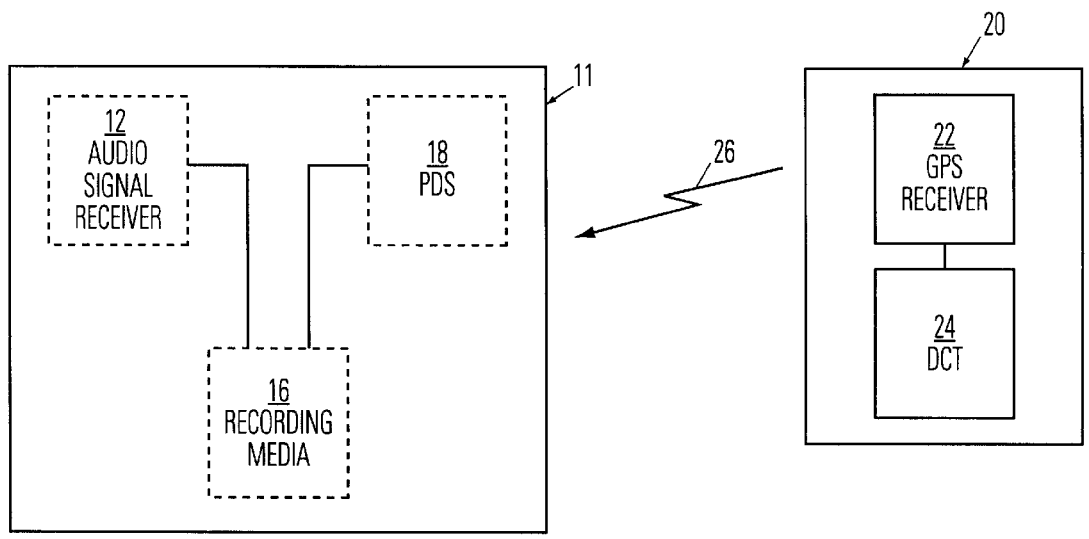
FIG. 3 is a schematic diagram of an integrated position determining system and portable audio recording device adapted to receive differential corrections in accordance with the present claimed invention.

With reference now to FIG. 3, a schematic diagram of an integrated position determining and portable audio recording device adapted to receive differential corrections is shown. As in the embodiment of FIG. 2, portable audio recording device 11 of the present embodiment includes an audio signal receiver 12, a position determining system 18, and recording media 16. In the present embodiment, however, portable audio recording device 11 is communicatively coupled to a differential corrections station 20. In the embodiment of FIG. 3, differential corrections station 20 includes a GPS receiver 22, and a differential corrections transmitter (DCT) 24. Differential corrections station 20 is communicatively coupled to portable audio recording device 11 via communication link 26. Thus, the present invention is also well suited to recording position information which has undergone differential corrections to provide even more accurate position information. Position determining system 18 is also able to generate velocity information when portable audio recording device 11 is moving. In the present embodiment, velocity information is obtained by measuring the Doppler shift of signals between position determining system 18 and radio navigation signal transmitters such as, for example, GPS satellites, not shown. The Doppler shift velocity measurements are obtained using well known and well understood techniques indigenous to the GPS receiver art.

In another embodiment of the invention, the position information is automatically recorded or embedded as part of corresponding audio information digitally recorded by the portable audio recording device. The original digitally recorded audio is re-formed as a modified digital recording, now containing the position information recorded at the time the original audio information was digitally recorded. The integrated digital information containing both audio and position information is stored in the portable audio recording device. In so doing, any attempt to modify or alter the recorded position information also results in a corresponding modification or alteration of the recorded audio information.

In one approach to detect any attempt to modify or alter the position information, original digitally recorded audio information is stored in addition to the integrated digitally recorded audio information that contains the position information. The bit array of the original digitally recorded audio information is compared with the bit array of the integrated digitally recorded audio information and position information. In so doing, it can be determined which bits in the bit array were changed, whether each changed bit is one of the chosen subset of bits that contains the position information and whether the bit value of each changed bit in the modified digitally recorded audio information is correct based on the position information the chosen subset is to contain.

The position information integrated with the audio information can be presented in clear text or can be encrypted using an encryption algorithm with a selected encryption key and a corresponding decryption key. The selected encryption key can be prescribed independently of the content of the position information.

Alternatively, the encryption key can depend upon the content of the position information. In this alternative approach, a selected part of, or all of, the position information is treated as one or more parameters that determine the encryption key. For example, the location information and/or time information can be expressed in bit format and can be combined bit by bit with a selected bit pattern of appropriate length L, using exclusive OR or exclusive NOR or two's compliment to form an encrypted bit pattern. The encrypted bit pattern is then placed or is used to replace selected bits.

Figure 4:
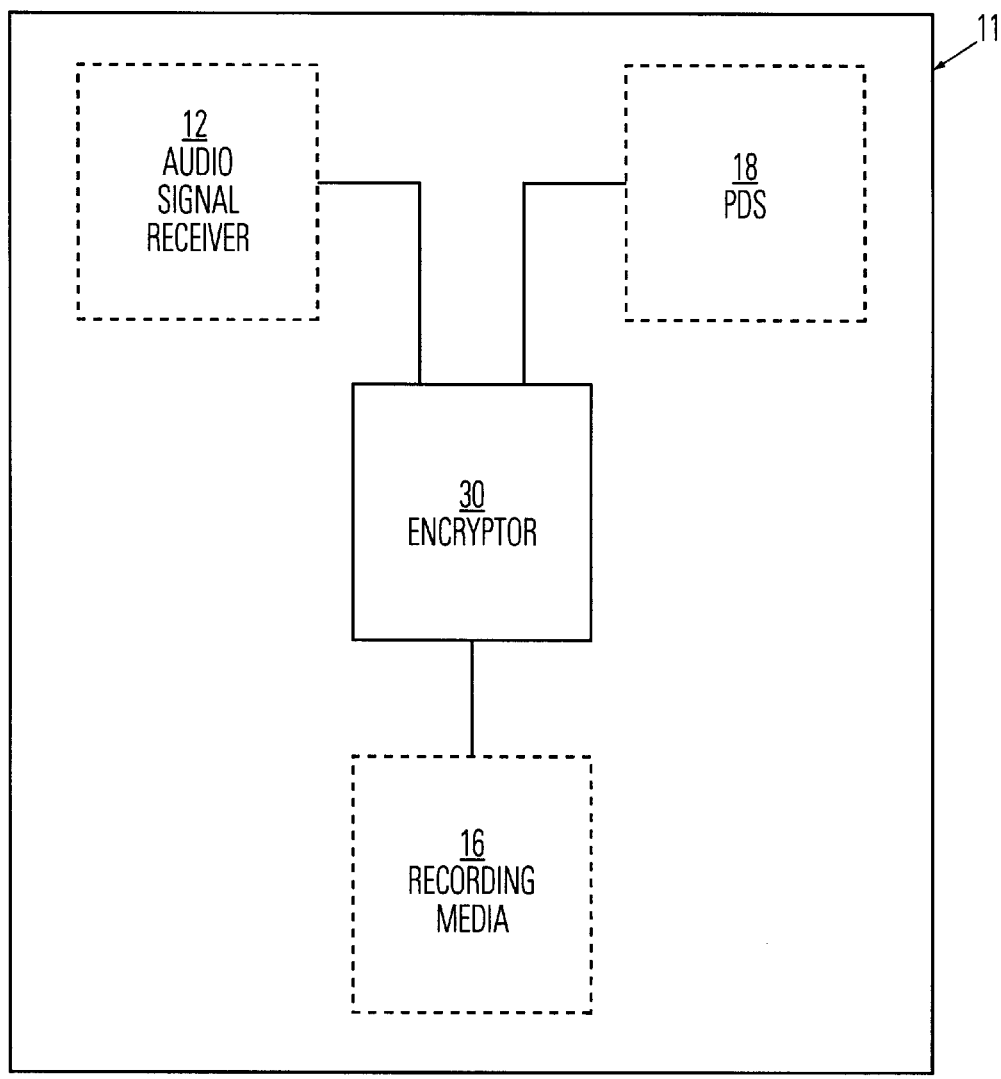
FIG. 4 is a schematic view of portable digital audio recording and authentication apparatus in accordance with the present claimed invention.

With reference now to FIG. 4, a schematic view of portable digital audio recording and authentication apparatus suitable for practice of the invention is shown. The apparatus further includes an encryptor 30 connected to (position determining system) PDS 18 that is activated by receipt of audio output signals from the audio signal receiver 12. Eneryptor 30, when activated, receives position information preferably, but not necessarily, digitally expressed from PDS 18 at the time digital audio information is recorded and provides this position information for storage with the corresponding digital audio information. Thus, portable audio recording device 11 receives the position information from PDS 18 and integrates this position information with the corresponding digital audio information received from audio signal receiver 12 and stores the integrated digital audio information and the corresponding position information in a digital frame for subsequent playback or other use.

After the integrated digital audio information and the corresponding position information are stored, a lock mechanism, not shown, connected to portable audio recording device 11 becomes operative to lock the integrated digital information in place so that the integrated digital information can not be altered or deleted. A download port, not shown, connected to the portable audio recording device and/or to the lock mechanism allows downloading of the integrated digital information. Optionally, downloading of the integrated digital information through the download port is permitted only by an authorized downloader, through entry of a digital key in software at the port or through use of a physical key at the port.

Once the digital frame is formed, this frame may be frozen within recording media 16 of portable audio recording device 11 so that integrated digital information cannot be altered or deleted in any way, but can be audibly displayed or can be downloaded and processed by an authorized downloader, to exhibit the audio and the corresponding position information for authentication. The integrated digital information and authentication information is never transmitted to another person or facility and thus is not interceptible or vulnerable to deletion or alteration by a person or facility with an incentive to make such deletions or alterations. The chain of custody of the image is preserved and is not compromised through custody of the portable audio recording device and its stored audio information.

The integrated digital information is downloaded directly from portable audio recording device 11 possibly using a portion of or all of the position information to provide a key for decryption. Authentication of the image is provided by comparing the position information contained in the digital frame with the putative position information that is asserted or is one file elsewhere. If the downloaded or displayed position information and the putative position information substantially agree, the corresponding integrated digital information on that frame may be authenticated. If the downloaded or displayed position information and the putative position information do not substantially agree, authentication of the corresponding integrated digital information on that frame may be withheld.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

I claim:

1. An integrated position determining and handheld portable audio-only recording apparatus comprising:
    a handheld portable audio-only recording device, said handheld portable audio-only recording device without video recording capability, said handheld portable audio-only recording device further including:
        receiver receiving audio input signals;
        a position determining system generating position information indicative of the location of said handheld portable audio-only recording device;
        recording media storing said audio input signals received by said receiver; and
        a selection mechanism coupled to said position determining system for receiving user input such that, upon the operation of said selection mechanism, position information is determined, said position information stored on said recording media so as to indicate the location at which said receiver receives said audio input signals, said position information integrated with said audio input signals to which said position information corresponds such that alteration of said position information stored on said recording media results in alteration of corresponding audio input signals stored on said recording media, said integrated position information and audio input signals encryrted using an encryption key based upon content of said position information such that said integrated position information and audio input signals are stored in an encrypted manner on said recording media.

2. The integrated position determining and handheld portable audio-only recording apparatus of claim 1 wherein said position determining system is selected from the class of satellite-based radio navigation systems consisting of the Global Positioning System and the Global Orbiting Navigation System.

3. The integrated position determining and handheld portable audio-only recording apparatus of claim 1 wherein said position determining system is selected from the class of ground-based radio navigation systems consisting of LORAN, Shoran, Decca, and TACAN.

4. The integrated position determining and handheld portable audio-only recording apparatus of claim 1 wherein said recording media is further comprised of solid state recording media.

5. The integrated position determining and handheld portable audio-only recording apparatus of claim 1 wherein said position information generated by said position determining system further includes the time at which said handheld portable audio-only recording device is at a given location.

6. A method for position and time-stamping a handheld audio-only recording comprising the steps of:
    providing a handheld portable audio-only recording device not having video recording capability that includes a receiver adapted to receiving audio input signals and recording media adapted to store audio input and a position determining system adapted to generate position information and a selection mechanism coupled to said position determining system for receiving user input;
    receiving audio input signals at said handheld portable audio-only recording device;
    storing said audio input signals onto recording media disposed in said handheld portable audio-only recording device;
    generating position information upon the operation of said selection mechanism using said position determining system wherein said position information is indicative of the location of said handheld portable audio-only recording device when said handheld portable audio-only recording device receives said audio input signals; and
    storing said position information on said recording media such that said audio input signals have position information stored therewith indicating the location at which said audio signals were received by said handheld portable audio-only recording device, said position information integrated with said audio input signals to which said position information corresponds such that alteration of said position information stored on said recording media results in alteration of corresponding audio input signals stored on said recording media, said integrated position information and audio input signals encrypted usin an encryption key based upon content of said position information such that said integrated position information and audio input signals are stored in an encrypted manner on said recording media.

7. The method for position and time-stamping an audio-only recording as recited in claim 6 wherein said step of storing onto recording media said audio input signals and said position information further comprises the step of storing said audio input signals and said position information onto solid state recording media of said handheld portable audio-only recording device.

8. The method for position and time-stamping an audio-only recording as recited in claim 6 wherein said step of generating position information further comprises the step of generating position information of said handheld portable audio-only recording device using a position determining system selected from the class of satellite-based radio navigation systems consisting of the Global Positioning System and the Global Orbiting Navigation System.

9. The method for position and time-stamping an audio-only recording as recited in claim 6 wherein said step of generating position information further comprises the step of generating position information of said handheld portable audio-only recording device using a position determining system selected from the class of ground-based radio navigation systems consisting of LORAN, Shoran, Decca, and TACAN.

10. The method for position and time-stamping an audio-only recording as recited in claim 6 wherein said step of generating position information further comprises the step of generating time information using said position determining system, said time information indicating the time at which said handheld portable audio-only recording device is at a given location.

11. A method for authenticating the location at which an audio recording was made comprising the steps of:
   providing a handheld portable audio-only recording device not having video recording capability that includes a receiver adapted to receiving audio input signals and recording media adapted to store audio input and a position determining system adapted to generate position information and a selection mechanism coupled to said position determining system for receiving user input;
   receiving audio input signals at said handheld portable audio-only recording device;
   generating position information using said position determining system, wherein said position information is indicative of the location at which said handheld portable audio-only recording device received said audio input signals;
   storing onto recording media said audio input signals and said position information corresponding to the location at which said handheld portable audio-only recording device received said audio input signals such that said stored audio input signals have corresponding position information stored therewith, said position information integrated with said audio input signals to which said position information corresponds such that alteration of said position information stored on said recording media results in alteration of corresponding audio input signals stored on said recording media, said integrated position information and audio input signals encrypted using an encryption key based upon content of said position information such that said integrated position information and audio input signals are stored in an encrypted manner on said recording media.

12. The method as recited in claim 11 wherein said step of generating position information includes the step of:
   generating said position information using a position determining system which is integral with said handheld portable audio-only recording device.

13. The method as recited in claim 12 wherein said step performed by said handheld portable audio-only recording device of generating position information includes the step of generating position information using a position determining system selected from the class of satellite-based radio navigation systems consisting of the Global Positioning System and the Global Orbiting Navigation System.

14. The method as recited in claim 12 wherein said step performed by said handheld portable audio-only recording device of generating position information includes the step of generating position information using a position determining system selected from the class of ground-based radio navigation systems consisting of LORAN, Shoran, Decca, and TACAN.

15. The method as recited in claim 12 wherein said step of generating position information includes the step of:
   indicating the time at which said handheld portable audio-only recording device receives said audio input signals.

16. The method as recited in claim 11 wherein said step of storing onto recording media said audio input signals and said position information includes the step of:
   storing said audio input signals and said position information onto recording media integral with said handheld portable audio-only recording device.

17. The method as recited in claim 11 wherein said step of storing onto recording media said audio input signals and said position information includes the step of:
   storing onto solid state recording media said audio input signals and said position information corresponding to the location at which said handheld portable audio-only recording device received said audio input signals.

* * * * *